United States Patent
So

[19]

[11] Patent Number: 5,822,545
[45] Date of Patent: Oct. 13, 1998

[54] METHOD AND APPARATUS FOR ELIMINATING ELECTROMAGNETIC INTERFERENCE AND NOISE CAUSED BY ALL UNNECESSARY SWITCHING/TOGGLING OF BUS SIGNALS

[75] Inventor: Kwai Chuen So, San Jose, Calif.

[73] Assignee: Cypress Semiconductor Corp., San Jose, Calif.

[21] Appl. No.: 960,585

[22] Filed: Oct. 29, 1997

Related U.S. Application Data

[63] Continuation of Ser. No. 566,505, Dec. 4, 1995, abandoned.

[51] Int. Cl.⁶ ........................................................ G06F 15/02
[52] U.S. Cl. ............................ 395/280; 395/306; 395/308
[58] Field of Search ..................................... 395/306, 308, 395/309, 280, 775, 292, 750, 281

[56] References Cited

U.S. PATENT DOCUMENTS

| 5,046,023 | 9/1991 | Katsura et al. ........................ 364/518 |
| 5,319,388 | 6/1994 | Mattison et al. ....................... 345/190 |
| 5,335,321 | 8/1994 | Harney et al. .......................... 395/162 |
| 5,335,322 | 8/1994 | Mattison ................................. 395/164 |
| 5,450,542 | 9/1995 | Lehman et al. ......................... 395/162 |
| 5,522,050 | 5/1996 | Amini et al. ............................ 395/306 |
| 5,542,055 | 7/1996 | Amini et al. . |
| 5,596,756 | 1/1997 | O'Brien . |

OTHER PUBLICATIONS

Shanley, Tom; Anderson, Don; PCI System Architecture; pp. 310, 387, Nov. 1995.

*Primary Examiner*—Ayaz R. Sheikh
*Assistant Examiner*—Rupal D. Dharia
*Attorney, Agent, or Firm*—Blakely, Sokoloff, Taylor & Zafman LLP

[57] ABSTRACT

A method and apparatus for eliminating all unnecessary switching/toggling of bus signals is provided. A first circuit that is coupled to a first and second bus is provided. This first circuit selectively couples (i.e., transparently passes) a first signal from the first bus to the second bus in response to a control signal. A control/decoder circuit, coupled to the first circuit, generates the control signal based upon whether or not a bus cycle on the first bus is directed to a device coupled to the second bus. If the address is directed toward a device coupled to the second bus, the present invention transparently passes the bus signals on the first bus to the second bus. If not, the control/decoder circuit instructs the first circuit not to propagate the bus signals from the first bus to the second bus. In other words, the value of the bus signals on the second bus are unchanged.

14 Claims, 12 Drawing Sheets

METHOD AND APPARATUS FOR ELIMINATING ELECTROMAGNETIC INTERFERENCE AND NOISE CAUSED BY ALL UNNECESSARY SWITCHING/ TOGGLING OF BUS SIGNALS

This is a continuation of application Ser. No. 08/566,505, filed Dec. 4, 1995, now abandoned.

BACKGROUND OF THE INVENTION

1. Field of the Invention

This invention relates generally to computer systems, and more particularly to bus bridges.

2. Art Background

Figure 1:
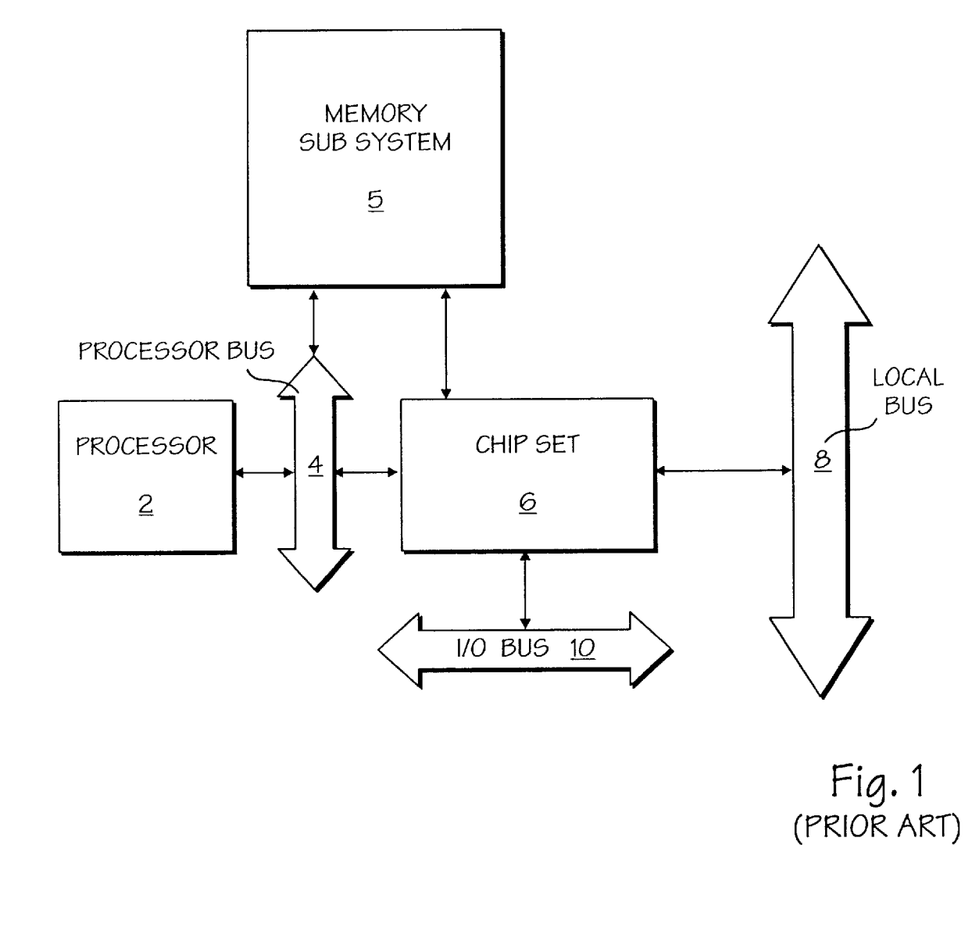
FIG. 1 illustrates a prior art computer system.

FIG. 1 illustrates a prior art computer system in which unnecessary switching/toggling of bus signals occurs. In this prior art system, a processor 2 is coupled through a processor bus 4 to a chip set 6. The chip set is coupled to a local bus 8 (e.g., Peripheral Component Interconnect (PCI) bus) and also an input/output (I/O) bus 10 (e.g., Industry Standard Architecture (ISA) bus). In this prior art computer system, the processor 2 sends a request for data/information to the chip set 6, which then automatically propagates the address to both the PCI bus 8 and the I/O bus 10.

Although the addresses are automatically propagated to both the PCI bus 8 and the I/O bus 10, frequently the addresses are directed toward a memory subsystem 5 (i.e., a cache (e.g., SRAM) or a main memory (e.g., DRAM)), which are both coupled to the processor bus 4, and not to peripheral devices (not shown) that are coupled to either the local bus 8 or the I/O bus 10. Accordingly, many of the address signals unnecessarily toggle (i.e., switch) on both the local bus 8 and the I/O bus 10.

This unnecessary switching and toggling of the addresses on the local bus 8 and the I/O bus 10 causes several noteworthy problems. First, this excessive switching causes electromagnetic interference (EMI). Moreover, this EMI presents unnecessary noise to the computer system. This noise and EMI require expensive shielding schemes to prevent the EMI from corrupting other signals in the computer system.

For example, the length from the chip set 6 to a device coupled either on the local bus 8 or the I/O bus 10, is typically anywhere from 6 to 18 inches. Since the strength of EMI is proportional to this length, it will be readily understood that the EMI, generated by this unnecessary switching, can easily be of a magnitude as to cause significant problems to a computer system. The length, discussed above, is determined by measuring the traces (e.g., the traces on the baseboard to a bus slot and then following the traces on a peripheral card) to a particular device.

Second, in any computer system in which minimization of power is important, this unnecessary toggling/switching consumes power. For example, in a CMOS design, where a conscious effort is made to minimize power consumption, this unnecessary toggling of bus signals dissipates power.

Third, many countries require personal computers to be certified that their radio frequency interference (RFI) level does not exceed specified limits. In the United States for example, the Federal Communications Commission (FCC) requires that all PCs sold to residential users must carry FCC Part 15 Sub-part J Class B approval. Class B approval is much more stringent that Class A, which is for commercial and industrial uses. Many PC companies delay the introduction of product because of RFI problems, or they increase the product price to cover the cost of additional RF noise shielding materials that may be required. There are many sources of RFI in a PC, a primary one being the high-speed switching transitions of digital signals on the system board (commonly called the motherboard), adapter cards, and peripherals. If not properly contained or attenuated, the unnecessary switching generates noise that radiates as Electromagnetic Interference (EMI) or is conducted by the AC line (e.g., Line Conduction Interference (LCI)).

Most of the timing signals used by adapter cards and peripherals originate on the system board. If the number of transitions can be reduced, the RFI level can be minimized.

Accordingly, there is a need for a method and apparatus to eliminate the noise and EMI stemming from the unnecessary toggling/switching of bus signals.

SUMMARY OF THE INVENTION

A method and apparatus for eliminating the EMI and noise from unnecessary switching and toggling of bus signals is provided. The present invention may be implemented in a bridge device that is coupled to a first bus and a second bus, each bus having a different set of bus commands and timing constraints.

The present invention includes a first circuit that is responsive to a control signal, for selectively coupling (i.e., transparenty passing) a bus signal from the first bus and providing that signal to the second bus. The present invention also includes a control circuit/decoder, that is coupled to the first circuit for controlling the first circuit based upon at least one command/control signal from the first bus and the address provided on the first bus.

In a preferred embodiment, the present invention is implemented in a CY82C691/2/3hyperCache™ Chipset for the Pentium CPU made by Cypress Semiconductor Corp., the assignee of this patent application. This chipset uses a technique called QuietBus (i.e., the teachings of the present invention) to achieve lower RFI from ISA (Industry Standard Architecture, also known as the AT bus) adapter cards and peripherals. It works as follows. The chipset decodes the address from the processor, to determine the destination of the current bus cycle. If the access is targeting a device on the ISA bus, the ISA address/data bus and the bus control signals will be switched to the proper level of ISA timing. However, if this bus cycle is targeted for another device (e.g., the on-board DRAM), then the ISA address/data bus signals will be kept at the same level as the previous access. This eliminates any unnecessary signal transitions on the ISA address/data bus. In addition, the control signals will not be asserted, indicating to the ISA devices that the current access is not a valid ISA bus cycle.

The present invention for providing a QuietBus helps system designers to simplify their RFI design issues and to reduce system cost.

BRIEF DESCRIPTION OF DRAWINGS

The present invention is illustrated by way of example and not limitation in the figures of the accompanying drawings in which like references indicate similar elements.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances, well known electrical structures and circuits are shown in block diagram form in order not to unnecessarily obscure aspects of the present invention.

Figure 2:
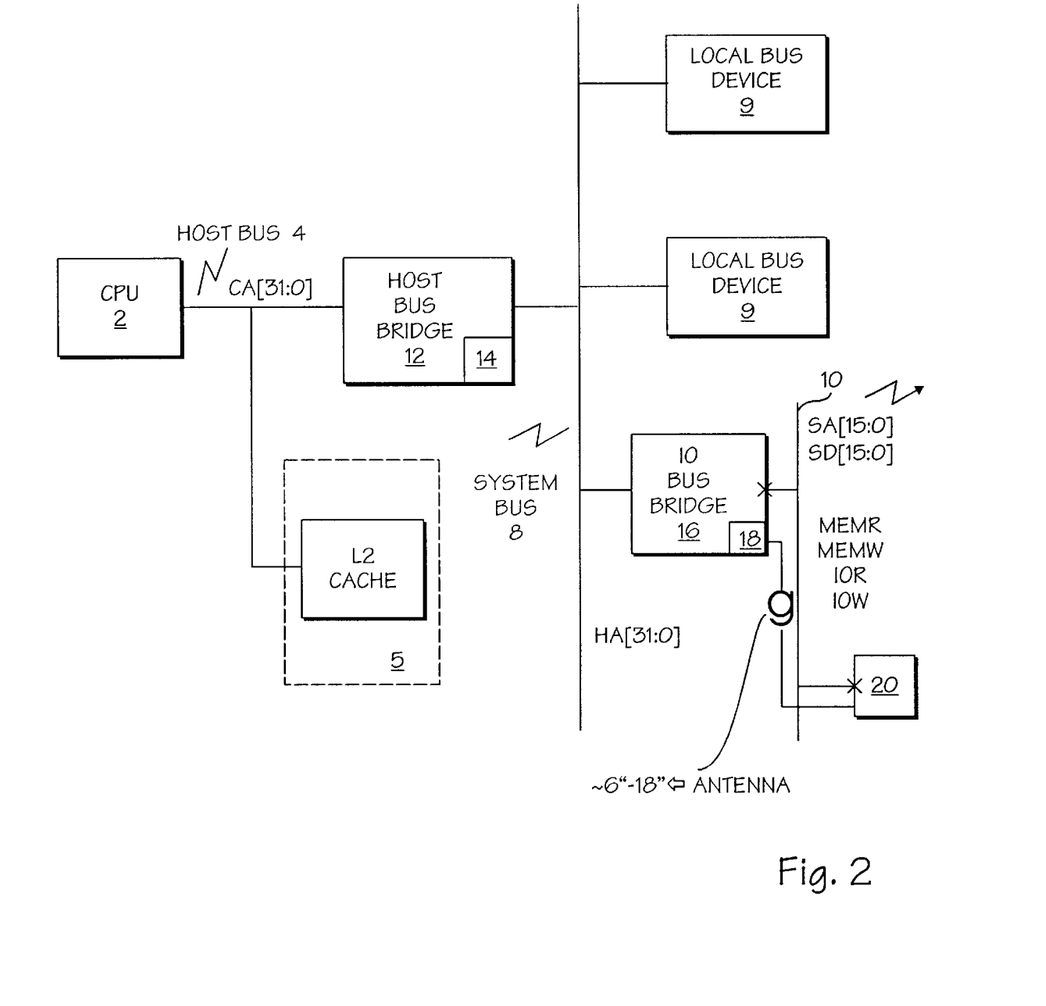
FIG. 2 illustrates a computer system in which the present invention may be implemented.
Figures 10, 11:
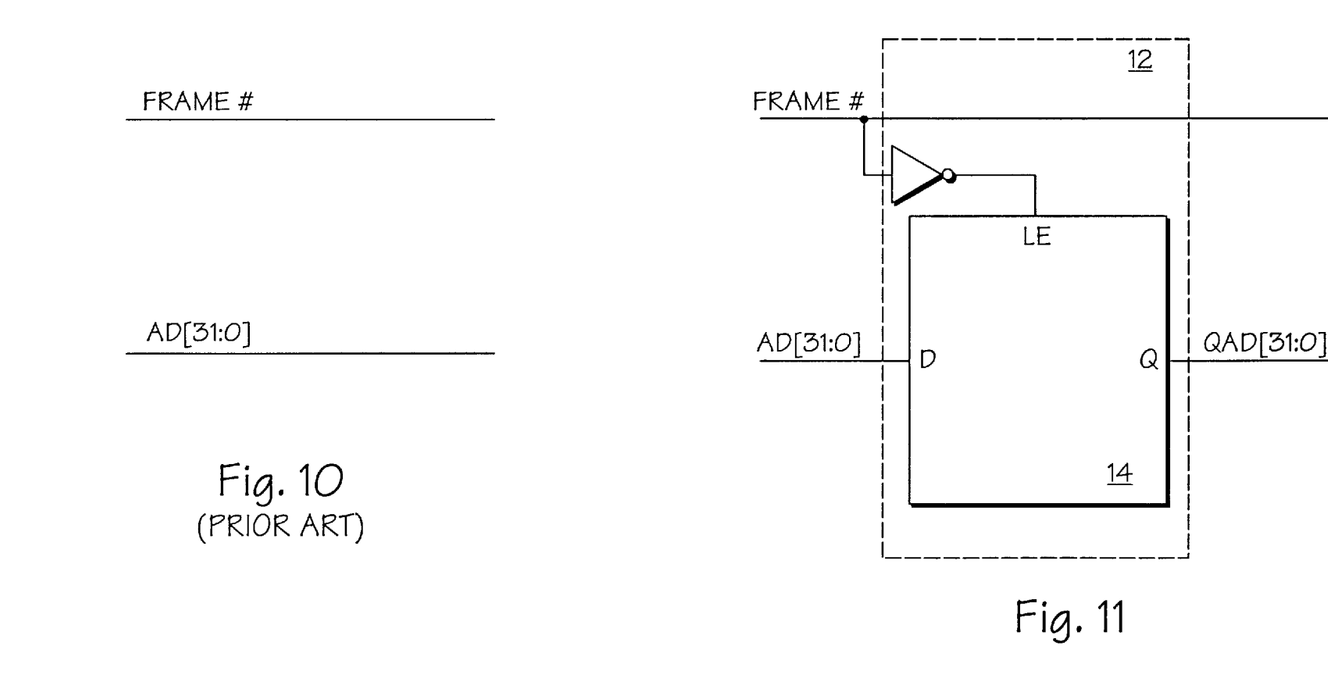
FIG. 10 illustrates a prior art approach for interfacing a host processor bus with a local bus.
FIG. 11 illustrates an alternative embodiment of the present invention.

FIG. 2 illustrates a computer system in which the present invention may be implemented. This computer system includes a processor 2 coupled to a host bus bridge 12 via a host bus 4. The processor 2 is also coupled to a memory (not shown) and a cache 5 via the host bus 4. The host bus bridge 12 is coupled to both the host bus 4 and the system bus 8 (e.g., a PCI bus). The host bus bridge 12 translates bus cycles associated with the host bus 4 into bus cycles that are understandable to the system bus 8 and vice versa. The present invention may be implemented in the host bus bridge 12 as circuit element 14. FIG. 11 illustrates this embodiment of the present invention.

In this computer system, a number of local bus devices 9 are coupled to the system bus 8 and compliant with the bus protocol associated with the system bus 8. An I/O bus bridge 16 is coupled to the system bus 8 and an I/O bus 10 (e.g., an ISA bus) and provides an interface between these two buses. The I/O bus bridge 16 translates bus cycles associated with the system bus 8 into bus cycles that are understandable by the I/O bus 10 and vice versa.

The teachings of the present invention may also be implemented in the I/O bus bridge 16 as circuit element 18. FIGS. 3–8 illustrate how the present invention is implemented in I/O bus bridge 16. The I/O bus 10 also includes a plurality of I/O bus devices 20 (e.g., keyboard, mouse, serial and parallel ports).

Figure 3:
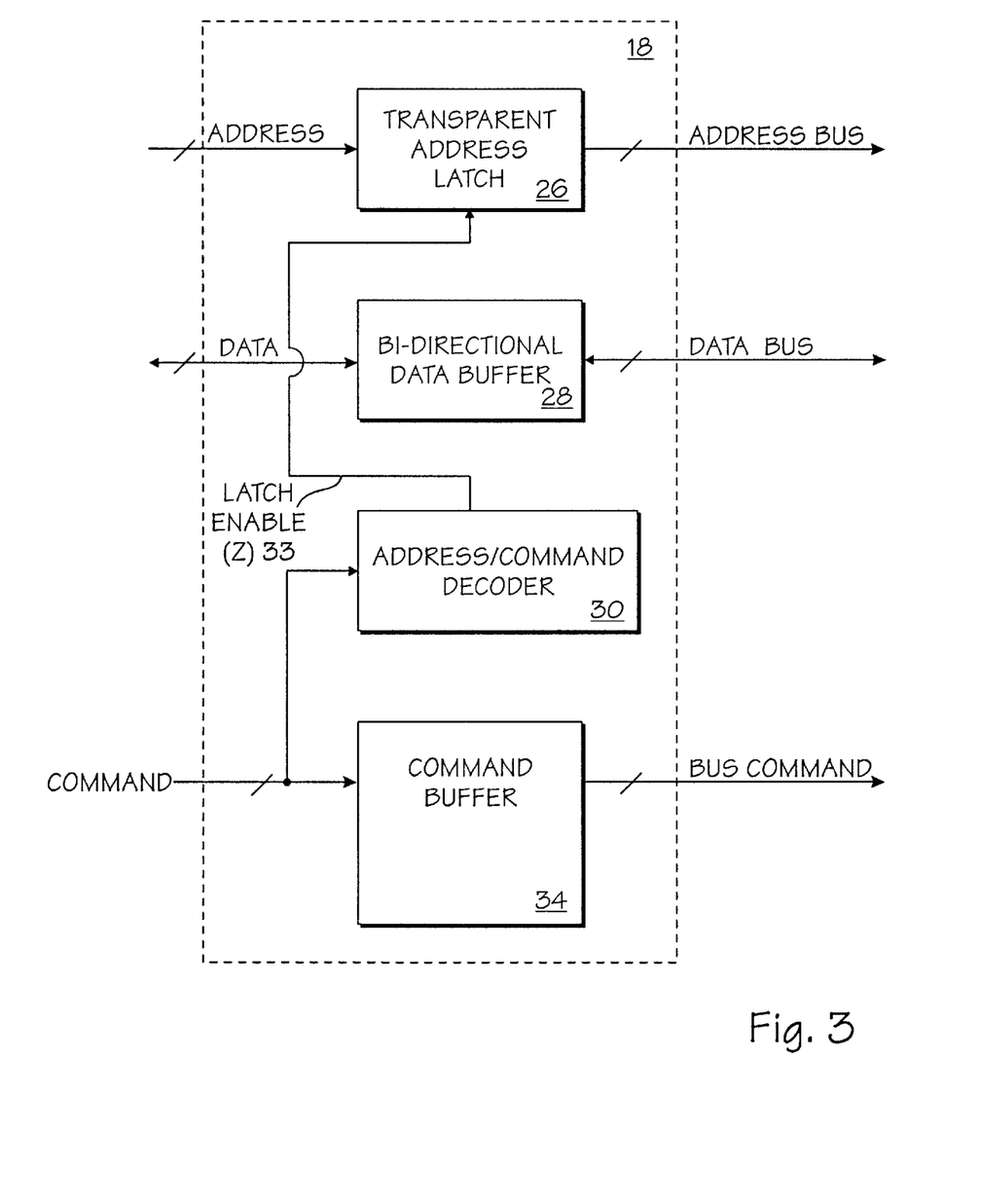
FIG. 3 illustrates a block diagram of one embodiment of the present invention.

FIG. 3 illustrates the functional blocks of the present invention. The present invention includes a transparent address latch 26 for transparently passing/coupling a plurality of address signals from a first bus to a second bus, a bi-directional data buffer 28 for buffering a plurality of data signals, and an address/command decoder that selectively enables the transparent address latch 26 via a latch enable signal (Z) 33. The present invention 14 also includes a command buffer 34 that buffers read and write commands from a first bus (e.g., a system bus) to a second bus (e.g., an input/output bus).

Figure 4:
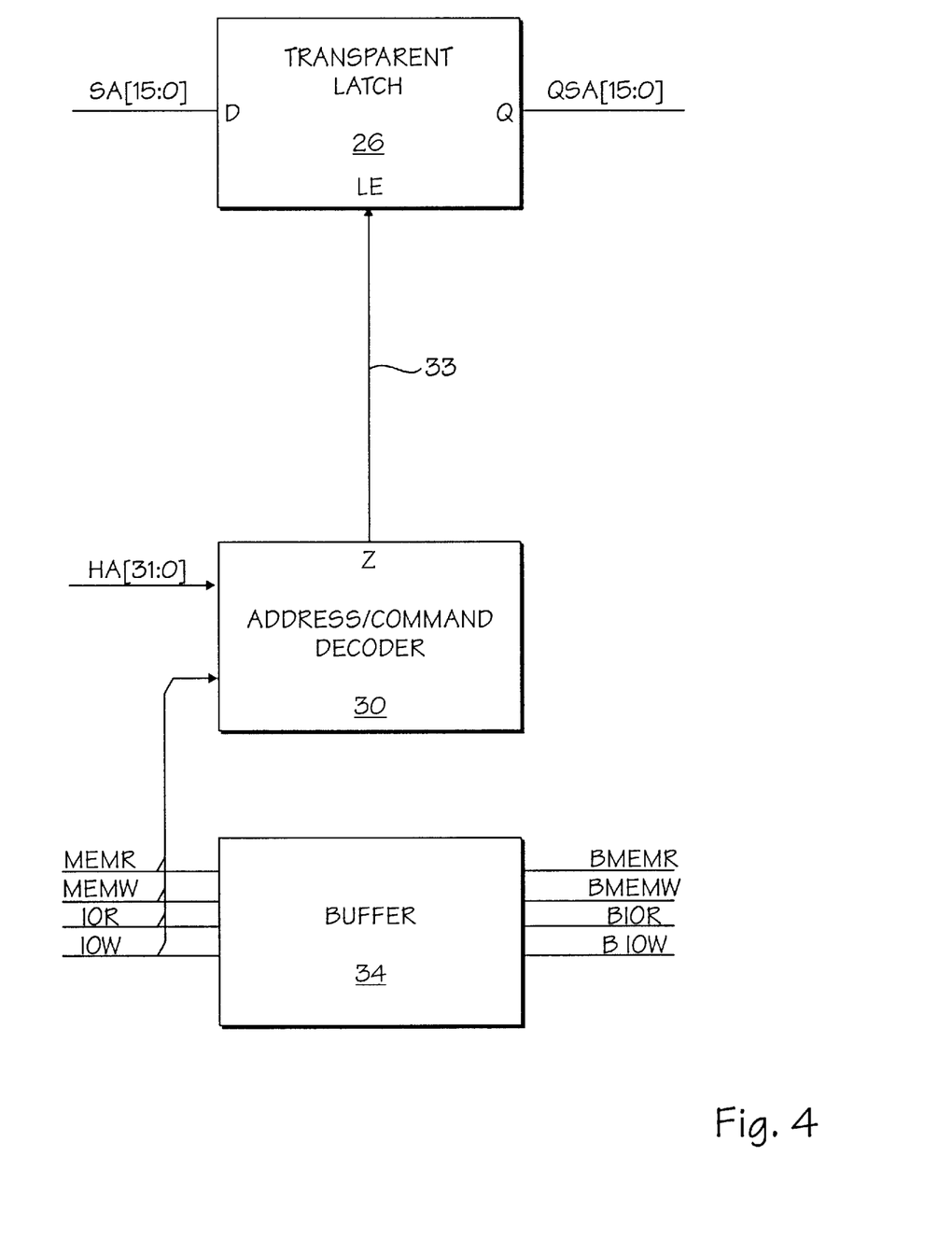
FIG. 4 illustrates a circuit diagram of the present invention.

FIG. 4 illustrates in greater detail the device for eliminating EMI and noise from unnecessary bus transitions of the present invention. The transparent address latch 26 has a plurality of address inputs for receiving a plurality of address signals (e.g., SA[15:0]). The address latch 26 provides as its output, a latched version of the input addresses (QSA[15:0], where the Q stands for "quiet" addresses). The bi-directional data buffer 28 (not shown in this figure) simply buffers the data signals and increases the driving capacity of each of these signals.

As previously noted, the address/command decoder 30 controls the transparent address latch 26 via the latch enable signal 33 (also referred to as signal Z). This transparent latch 26 passes the signals (i.e., couples without modification) from the first bus to the second bus when the latch enable signal 33 is asserted. The address/command decoder 30 has a plurality of input pins for receiving a plurality of address signals (HA[31:0]) and also read and write commands (e.g., MEMORY_READ[MEMR], MEMORY_WRITE [MEMW], Input/Output_READ[IOR], Input/Output_ WRITE[IOW]. The address/command decoder 30 will be described in greater detail hereinafter.

The command buffer 34 simply buffers the read and write control signals and further increases the driving capacity of each of these command signals. The transparent latch 26 may be implemented using a 74LS373 part (octal transparent latch), and the command buffer 34 may be implemented using a 74ALS244 part (octal bus driver). The bi-directional data buffer 28 may be implemented using a 74ALS245 part (octal bi-directional bus driver).

Figure 5:
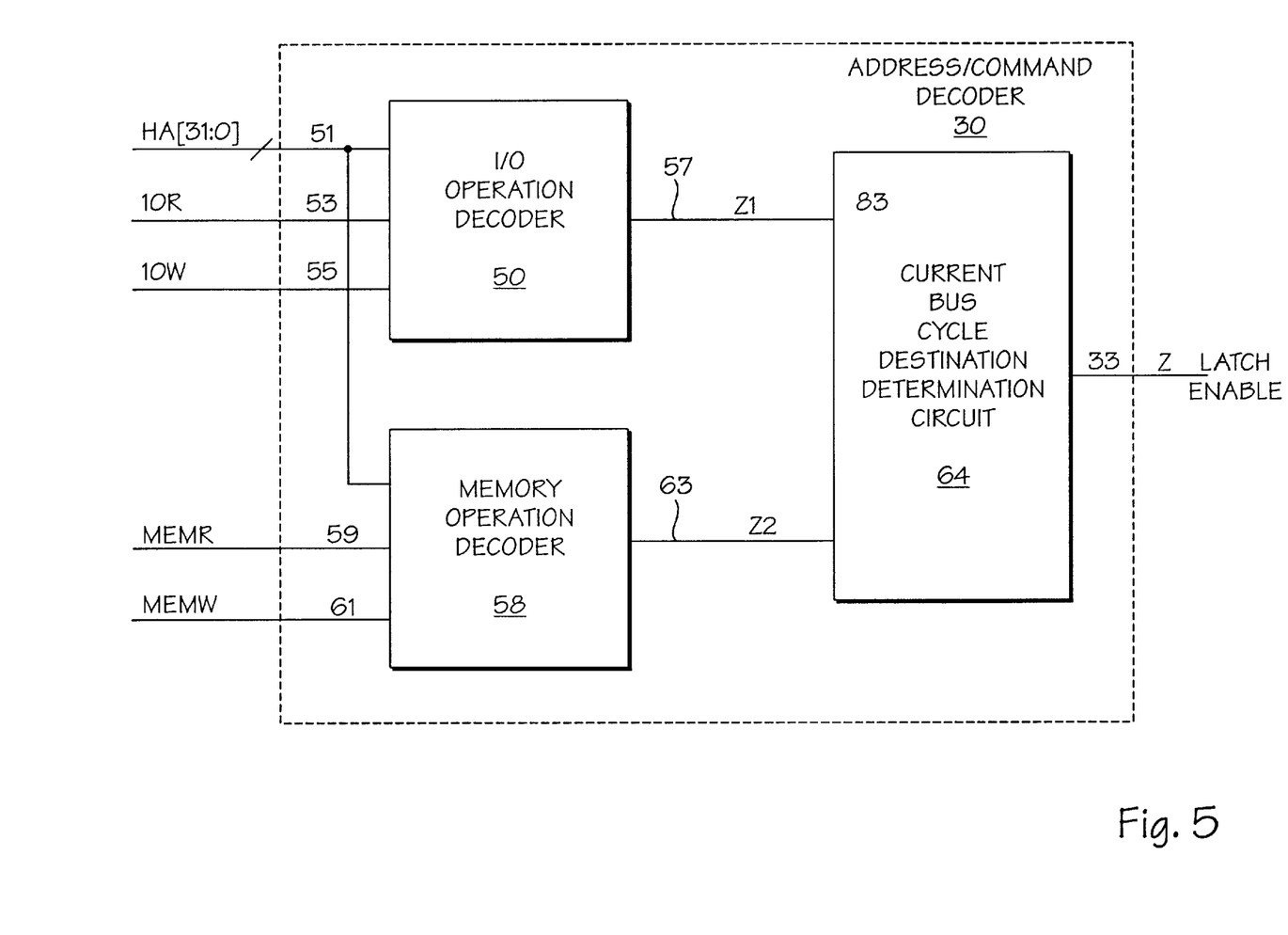
FIG. 5 illustrates the address/command of the decoder logic, as shown in FIG. 4.

FIG. 5 illustrates a block diagram of the functional blocks in the address/command decoder 30. The address/command decoder 30 includes an I/O operation decoder 50, a memory operation decoder 58, and a current bus cycle destination determination circuit 64. The I/O operation decoder 50 has a plurality of address inputs 51 for receiving a plurality of address signals from a first bus (e.g., HA[31:0]) the I/O operation decoder 50 also has an input 53 for receiving an I/O READ signal (IOR) and an additional input 55 for receiving an I/O WRITE signal (IOW).

The I/O operation decoder 50 in response to plurality of address signals, the IOR signal and the IOW signal generates an output signal 57 (Z1) that indicates that a current I/O bus cycle is targeted to a second bus. The Z1 signal 57 is provided to the current bus cycle destination determination circuit 64.

The memory operation decoder 58 has a plurality of input pins for receiving a plurality of addresses (e.g., HA[31:0]) from the first bus and two input pins for receiving a MEMORY_READ signal 59 (MEMR) and MEMORY_ WRITE signal 61 (MEMW), respectively. The memory operation decoder 58 in response to the plurality of address signals, and the MEMR and MEMW signals 59 and 61, generates a Z2 signal 63. The Z2 signal 63 indicates that the current memory operation (i.e., the bus cycle), is targeted to a device that resides on the second bus. The memory operation decoder 58 provides the Z2 signal 63 to the current bus cycle destination determination circuit 64.

The current bus cycle destination determination circuit 64 has two inputs: one for receiving Z1 signal 57 and the other for receiving the Z2 signal 63. In response to the signals, the destination determination circuit 64 generates a latch enable signal 33 (i.e., the Z signal) that controls the transparent data latch 28 and the transparent address latch 26. Accordingly, the address/command decoder 30 controls the address and data transparent latches in such a way so as to eliminate all unnecessary bus signal transitions on the second bus.

Figure 6A:
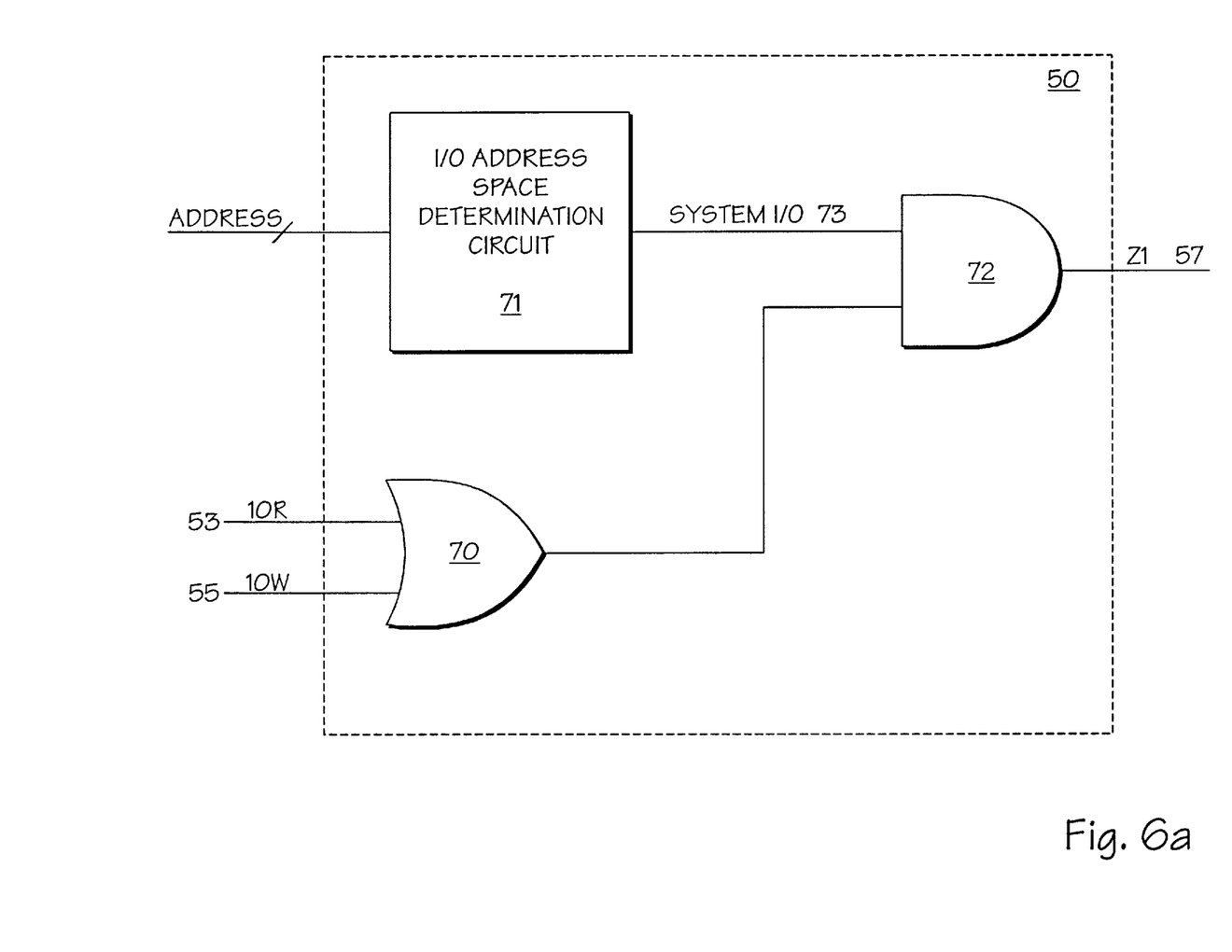
FIG. 6A illustrates a circuit diagram for generating the signal, Z1, as shown in FIG. 5.

FIG. 6A illustrates in greater detail the circuits that may be used to implement the I/O operation decoder 50. The I/O operation decoder 50, in one embodiment, includes an OR gate 70 and an AND gate 72. The OR gate 70 has as its inputs the IOR signal 53 and the IOW signal 55. If either of these signals are asserted, then the output of the OR gate 70 is asserted. The AND gate 72 has as its inputs the output of the OR gate 70 and a signal 73 which indicates whether or not the address on the first bus is within a first predetermined I/O address space (e.g. 0–1023 in the I/O address space 74).

Figure 6B:
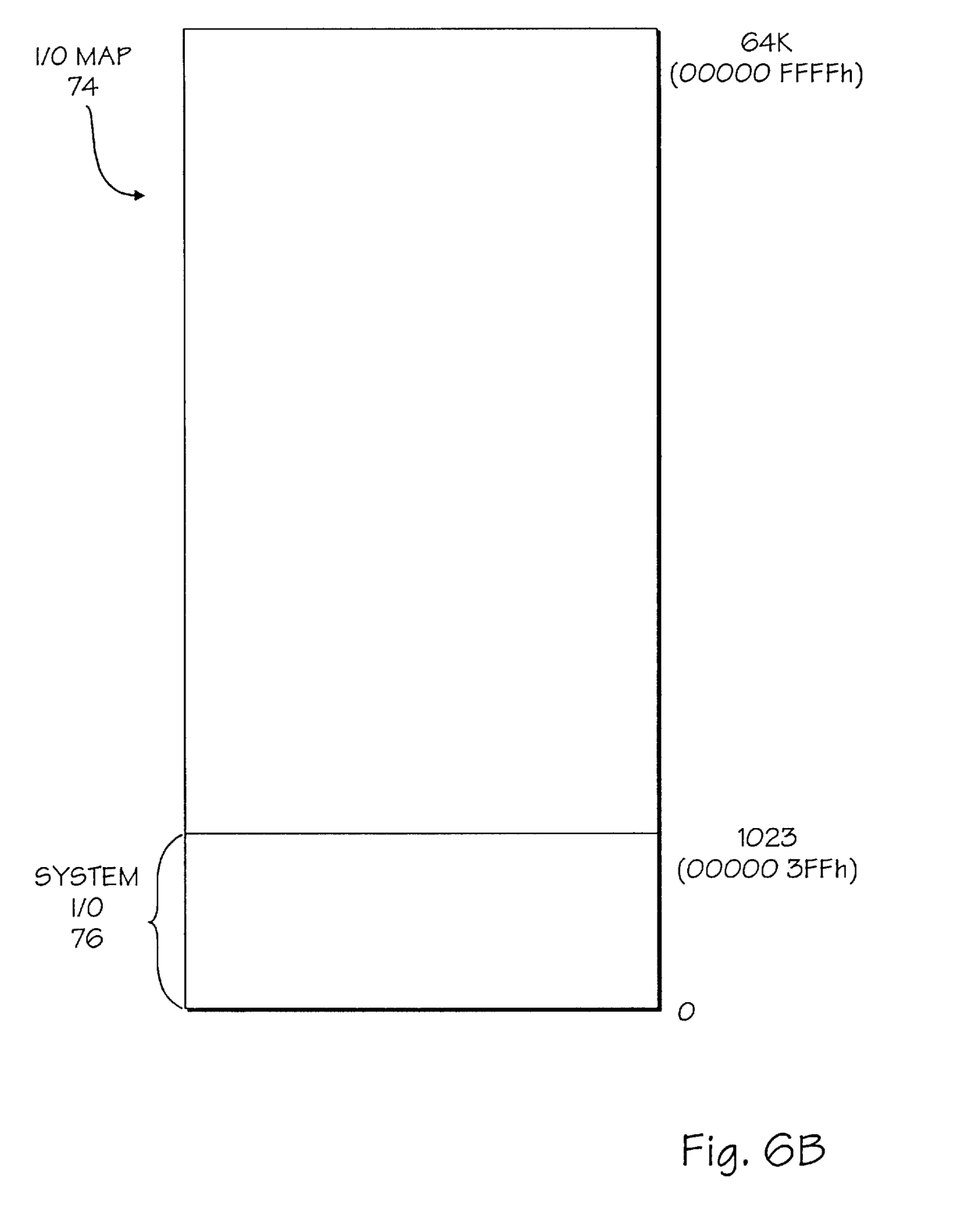
FIG. 6B illustrates the input/output address space.

FIG. 6B illustrates the I/O address space 74. The I/O address space determination circuit 71 determines whether or not the address from the local bus is in the system I/O space 76. If the address on the first bus is not in the predetermined address space 76, signal 73 is not asserted. If the address is within the predetermined address space 76, signal 73 is asserted. When the signal 73 and the output of the OR gate 70 are both asserted, the Z1 signal 57, is generated. The generation of signal 73, which indicates whether or not the current address on the first bus is within a pre-specified range of address, is known in the art and may be implemented using a series of decoders or comparators.

Figure 7A:
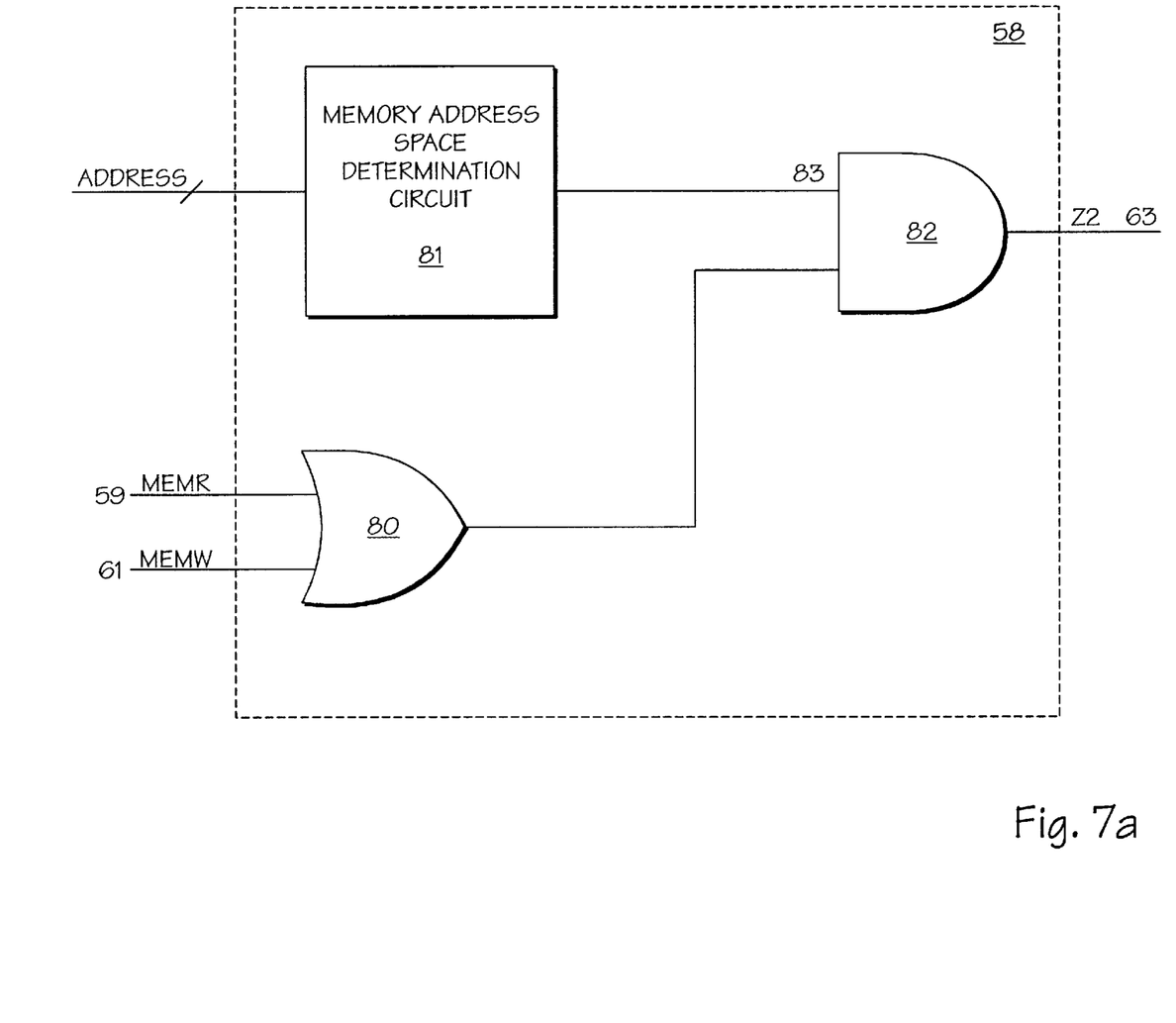
FIG. 7A illustrates a circuit diagram for generating the signal, Z2, as shown in FIG. 5.

FIG. 7A illustrates in greater detail the memory operation decoder 58 of the present invention, illustrated in FIG. 5. The memory operation decoder 58 includes an OR gate 80 having as its inputs the MEMR signal 59 and the MEMW signal 61, both of which are provided by the first bus. The output of the OR gate 80 is asserted if either of the MEMR signal 59 or the MEMW signal 61 is asserted.

The memory operation decoder 58 further includes an AND gate 82 having a first input for receiving a signal 83 from the memory address space determination circuit 81. The memory address space determination circuit 81 receives an address from the local bus and determines whether or not this address is within a predetermined range 86, as specified in FIG. 7B.

Figure 7B:
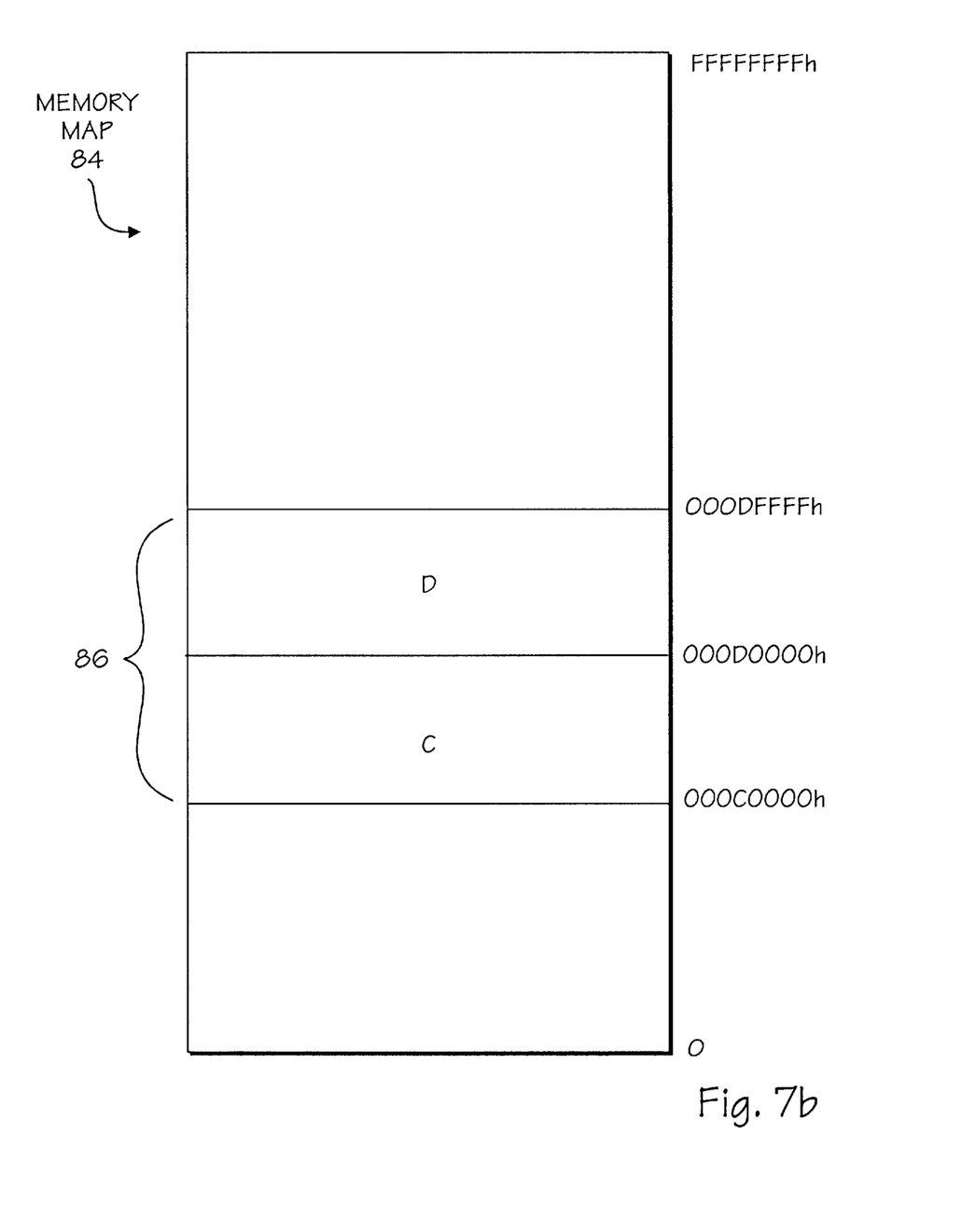
FIG. 7B illustrates the memory address space.

FIG. 7B illustrates the memory address space 84 of the computer system. If the memory address space determination circuit 81 determines that the address is within the predetermined range 86 of the memory address space 84, signal 83 is asserted. Otherwise, signal 83 is not asserted.

The AND gate 82 also includes a second input that is coupled to the output of the OR gate 80. If both the signal 83 and the output of the OR gate 80 are both asserted, the AND gate 82 generates an asserted Z2 signal 63.

Figure 8:
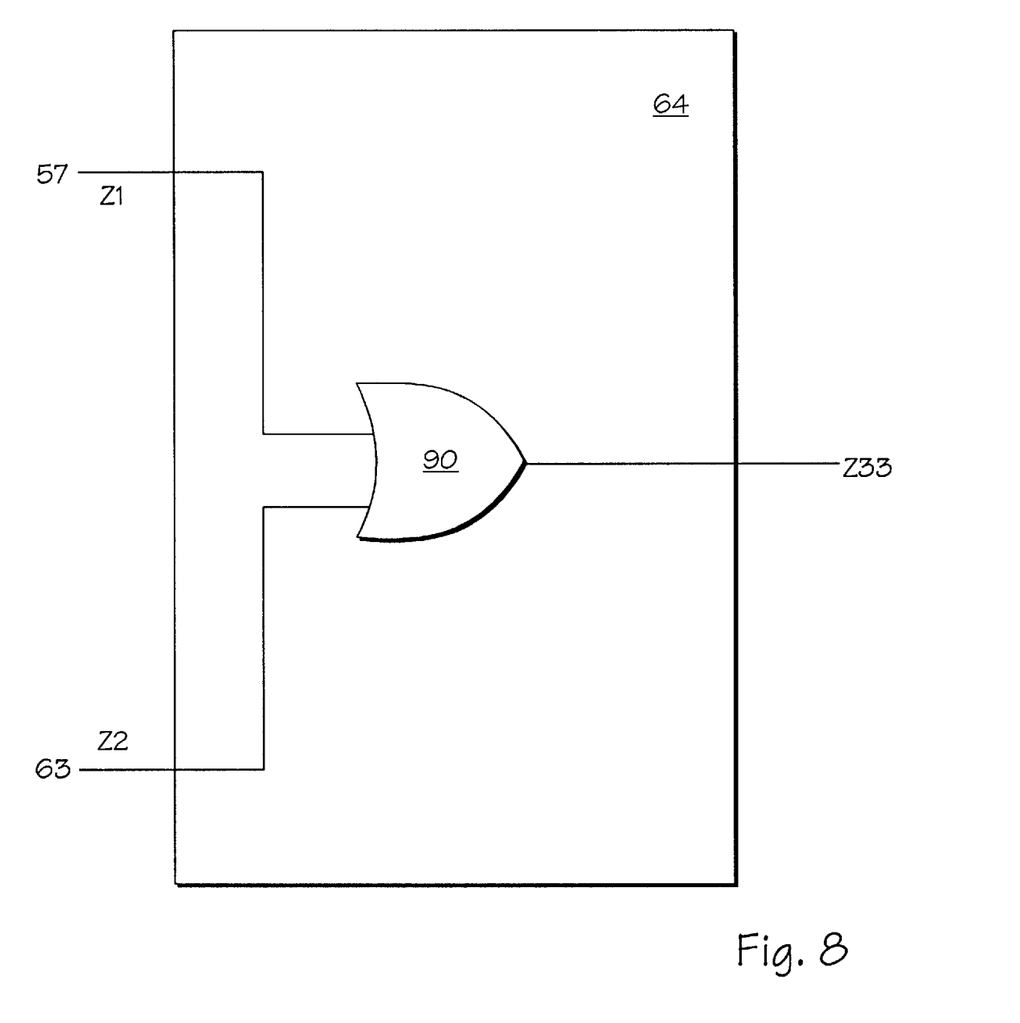
FIG. 8 illustrates the bus cycle destination determination circuit, as shown in FIG. 5.

FIG. 8 illustrates in greater detail the current bus cycle destination determination circuit 64. Determination circuit 64 in one embodiment, is an OR gate 90 having as its inputs the Z1 signal 57 and the Z2 signal 63. In response to these inputs, the OR gate 90 generates the Z signal 33 (i.e., the latch enable signal that controls the address and data latches).

Figure 9:
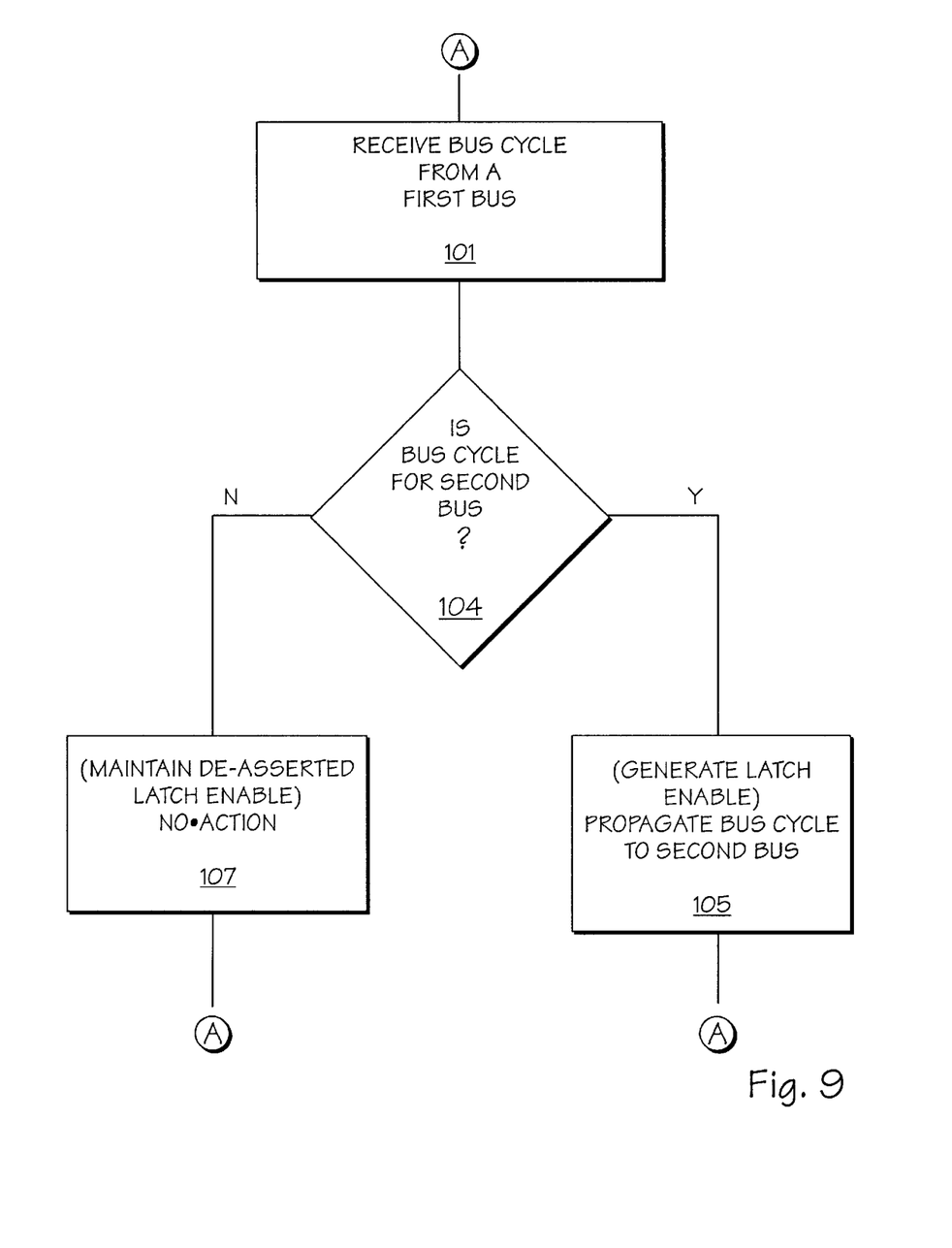
FIG. 9 illustrates the method steps of the present invention.

FIG. 9 illustrates the method steps of the present invention. The present invention receives a bus cycle from the first bus (step 101). The present invention then determines if the bus cycle is for a second bus (determination block 104). If yes, then the present invention generates a latch enable signal (step 105) to a transparent latch that couples (i.e., passes or propagates) the signals from the first bus to the second bus. Processing then continues to node A. If no, the present invention maintains a deasserted latch enable, and returns the processing to node A. The previous bus signals on the second bus (i.e., the outputs of the address latches of the present invention) do not change unless the latch enable signal 107 is asserted.

FIG. 10 illustrates a prior art approach for interfacing the processor bus 4 with a local bus 8 (i.e., a PCI bus). The PCI Bus Specification specifies that a key signal to indicate the start of a bus transaction is the FRAME# signal. This signal is an active low signal and is synchronous to the PCI clock signal.

FIG. 11 illustrates an alternative embodiment of the present invention in the host bus bridge 12. The host bus bridge 12 decodes the target of the cycle. If the host bus bridge 12 determines, by decoding the addresses from the processor, that the "downstream" devices (i.e., peripherals) coupled to a system bus or the input/output bus 10, the FRAME# signal is asserted.

In this embodiment of the present invention, the FRAME# signal is used to control a plurality of latches 14 (only one latch is shown). If the FRAME# signal is not asserted, all address and data lines remain at their previous levels. If the FRAME# signal is asserted, the transparent latches 14 (for address and data) are enabled. When transparent latches 14 are enabled, normal PCI transaction can take place. Thus, this alternative embodiment of the present invention, quiets down the local bus (i.e., the PCI bus).

The present invention determines if a bus cycle is for a second bus by using a number of different signals. For example, the addresses provided by the first bus are decoded to determine whether or not the memory operation or I/O operation is targeted to the second bus. Moreover, the present invention may use selected control signals from the first bus and decode these signals to determine whether or not the specific operation is a memory or I/O operation directed toward the second bus.

In the foregoing specification, the invention has been described with reference to specific exemplary embodiments thereof. It will however be evident that various modifications and changes may be made thereto without departing from the broader spirit and scope of the invention as set forth in the appended claims. The specification and drawings are accordingly to be regarded as illustrative rather than restrictive.

What is claimed is:

1. A device coupled to a first and second bus comprising:
   a) a latch, coupled to the first and second bus, for selectively passing information on the first bus to the second bus in response to a control signal; and
   b) a command/address decoder, coupled to the first bus and the latch, for generating the control signal when a bus cycle is directed to a device on the second bus; wherein the command/address decoder further includes a first decoder means coupled to the first bus for decoding input/output (I/0) bus cycles on the first bus, a second decoder means coupled to the first bus for decoding memory bus cycles on the first bus, and a bus cycle destination determination circuit means coupled to the first and second decoder, for determining the destination of the bus cycle on the first bus;
   wherein the first decoder means further includes a first OR gate having a first input for receiving an I/O read signal and a second input for receiving an I/O write signal, said first OR gate generating a signal indicating that an I/O operation is on the first bus, and a first AND gate having a first input for receiving the output of the first OR gate and a second input for receiving a signal indicating that an I/O bus cycle is on the first bus, said AND gate generating a signal indicating that the current bus cycle on the first bus is directed to a device on the second bus.

2. The device as set forth in claim 1 wherein the second decoder means further includes a second OR gate having a first input for receiving a memory read signal, a second input for receiving a memory write signal, and an output for generating a signal indicating that a memory operation is on the first bus; and     a second AND gate, coupled to the second OR gate, having a first input for receiving the output of the second OR gate and a second input for receiving a signal indicating that the current bus cycle on the first bus is a memory operation, said second AND gate generating a signal indicating that the current bus cycle on the first bus is directed to a device on the second bus.

3. The device as set forth in claim 1 wherein the bus cycle destination determination circuit includes a third OR gate having a first input for receiving a first signal indicating that a memory operation is on the first bus and a second input for receiving a signal indicating that an I/O operation is on the first bus, said third OR gate having an output for generating a signal for selectively transferring bus cycles on the first bus to the second bus.

4. The device as set forth in claim 1 wherein the latch comprises a D-Q latch.

5. The device as set forth in claim 1 wherein the control signals of the first bus are transferred to the second bus via a buffer.

6. The device as set forth in claim 1 wherein the address/command decoder in response to a bit of address information and a control signal from the first bus selectively generates a latch enable signal for enabling a transparent latch, said transparent latch in response to said latch enable signal coupling the information on the first bus to the second bus.

7. A bridge device, coupled to a first and second bus, each bus having a predetermined specification, each bus having a device, said device being compatible with the respective bus specification, said bridge device comprising:

a) translation means, coupled to the first and second bus, for translating bus cycles from the first bus into bus cycles that are understandable to the second bus and vice versa; and     b) means, coupled to the first and second bus, for selectively coupling information from the first bus to the second bus; wherein the means for selectively coupling information further includes decoder means for determining that a current bus cycle on the first bus is directed toward a device on the second bus and a latch, coupled to the first bus, second bus and the translation means, for selectively transferring information from the first bus to the second bus in response to a signal from the decoder means; wherein the decoder means further includes an I/O decoder having a first OR gate having a first input for receiving an I/O read signal and a second input for receiving an I/O write signal, said first OR gate generating a signal indicating that an I/O operation is on the first bus, and a first AND gate having a first input for receiving the output of the first OR gate and a second input for receiving a signal indicating that an I/O bus cycle is on the first bus, said AND gate generating a signal indicating that the current bus cycle on the first bus is directed to a device on the second bus.

8. The bridge device as set forth in claim 7 wherein the decoder means further includes a memory decoder having:

a second OR gate having a first input for receiving a memory read signal, a second input for receiving a memory write signal, and an output for generating a signal indicating that a memory operation is on the first bus; and     a second AND gate, coupled to the second OR gate, having a first input for receiving the output of the second OR gate and a second input for receiving a signal indicating that the current bus cycle on the first bus is a memory operation, said second AND gate generating a signal indicating that the current bus cycle on the first bus is directed to a device on the second bus.

9. The bridge device as set forth in claim 7 wherein the decoder means further includes a bus cycle destination determination circuit, said bus cycle destination determination circuit having a third OR gate having a first input for receiving a first signal indicating that a memory operation is on the first bus and a second input for receiving a signal indicating that an I/O operation is on the first bus, said third OR gate having an output for generating a signal for selectively transferring bus cycles on the first bus to the second bus.

10. The bridge device as set forth in claim 7 wherein the latch comprises a D-Q latch.

11. The bridge device as set forth in claim 7 wherein the control signals of the first bus are transferred to the second bus via a buffer.

12. The bridge device as set forth in claim 7 wherein the decoder means in response to a bit of address information and a control signal from the first bus selectively generates a latch enable signal for enabling a transparent latch, said transparent latch in response to said latch enable transferring the information on the first bus to the second bus.

13. The device of claim 1 wherein the bus cycle comprises a read or write cycle.

14. The bridge device of claim 11 wherein the bus cycle comprises a read or write cycle.

* * * * *